(12) United States Patent
Turner, Jr. et al.

(10) Patent No.: US 6,866,153 B2
(45) Date of Patent: Mar. 15, 2005

(54) DISPOSABLE NET ASSEMBLIES FOR APPARATUS FOR COLLECTING FLOATING DEBRIS

(75) Inventors: Richard R. Turner, Jr., Bloomfield, NJ (US); Robert Kircher, Clark, NJ (US); Dennis R. Moran, Caldwell, NJ (US); James P. Dugan, Marlton, NJ (US)

(73) Assignee: Fresh Creek Technologies, Inc., Cedar Grove, NJ (US)

( * ) Notice: Subject to any disclaimer, the term of this patent is extended or adjusted under 35 U.S.C. 154(b) by 0 days.

(21) Appl. No.: 10/705,350

(22) Filed: Nov. 10, 2003

(65) Prior Publication Data

US 2004/0096637 A1 May 20, 2004

Related U.S. Application Data

(62) Division of application No. 09/875,348, filed on Jun. 6, 2001, now Pat. No. 6,651,825.

(51) Int. Cl.⁷ .............................................. B01D 29/17
(52) U.S. Cl. ...................... 210/483; 210/162; 210/232; 210/448
(58) Field of Search ................................. 210/154, 155, 210/162–164, 232, 236, 237, 448, 452, 474, 477, 483–489; 55/378, 379; 404/2–4

(56) References Cited

U.S. PATENT DOCUMENTS

| | | |
|---|---|---|
| 231,066 A | 8/1880 | Long |
| 3,204,392 A | 9/1965 | Schwab |
| 3,282,430 A * | 11/1966 | Kinne .......................... 210/162 |
| 3,385,445 A | 5/1968 | Buchegger et al. |
| 3,419,151 A | 12/1968 | Smith et al. |
| 3,556,299 A | 1/1971 | Zievers et al. |
| 4,287,067 A | 9/1981 | Dyner |
| 5,202,020 A | 4/1993 | Desjoyaux et al. |
| 5,409,608 A | 4/1995 | Yoshida et al. |
| 5,562,819 A | 10/1996 | Turner, Jr. et al. |
| 5,755,962 A | 5/1998 | Gerhenson et al. |
| 6,517,709 B1 * | 2/2003 | Cardwell et al. ........... 210/164 |
| 6,551,023 B2 * | 4/2003 | Allard ......................... 405/36 |

OTHER PUBLICATIONS

EPA, *Combined Sewer Overflow Technology Fact Sheet*, No. EPA 832–F–99–037, Sep. 1999.
Fresh Creek Technologies, Inc., *Netting TrashTrap*, Product Bulletin, 1997.
Fresh Creek Technologles, Inc., *Shorelines Newsletter*, vol. 2, No. 3, Summer 1993.

* cited by examiner

*Primary Examiner*—Joseph Drodge
(74) *Attorney, Agent, or Firm*—Wood, Herron & Evans, L.L.P.

(57) ABSTRACT

A disposable net assembly is provided for a trap for collecting floatable debris in a waterway or combined sewer system. The net assembly includes a knitted bag-shaped mesh net having a frame surrounding the mouth of the net with the net secured around its rim to the frame. The net may be formed of an inner layer and an outer layer of mesh with the openings of the inner layer being substantially larger than the openings of the outer layer. The frame may be formed of a plastic molded material having side members tapered in the vertical direction to facilitate the changing of the netting assemblies and tapered in the downstream direction to lock into place under the force of the flow. Several embodiments of the frame members have projections thereon which cooperate with a clamping element to hold the net to the frame. Some embodiments of the members have parts that lock together with a post and hole construction while others employ a tension band to clamp the net to the projections on the frame. The net is preferably secured around its rim to the frame, with the mouth of the net extending around the outside and upstream side of the frame and over the surface having the projections. The net is preferably formed of a high strength and high stretch yarn, with rolled sewn seams and having reinforcing on the seams and on high stress areas of the net.

26 Claims, 9 Drawing Sheets

DISPOSABLE NET ASSEMBLIES FOR APPARATUS FOR COLLECTING FLOATING DEBRIS

This application is a Divisional of application Ser. No. 09/875,348, filed on Jun. 6, 2001, now U.S. Pat. No. 6,651,825, which is hereby incorporated by reference in its entirety herein.

The present invention generally relates to the collection and removal of trash or floating debris from waterways and, more particularly, to systems designed for use in combined sewer systems or storm drain conduits to trap water borne trash for removal.

BACKGROUND OF THE INVENTION

Trash and debris floating on the surfaces of waterways or along shorelines and beaches is a highly visible form of water pollution, which is receiving attention for its adverse, polluting effect and for its unaesthetic appearance on the surfaces of lakes and other water bodies. One type of system for the collecting and removing of floating debris has consisted of arrays of disposable mesh nets installed in receiving bodies of water in the flow path of a sewer outlet, particularly in applications referred to as "Combined Sewer Overflows" or "CSOs". Such systems are described in Vol. 2, No. 3, of Fresh Creek Technologies, Inc. "Shorelines" newsletter. Systems of this type are effective in collecting floatables or trash for removal and are shown in Fresh Creek Technologies, Inc. Netting Trashtrap™ Product Bulletin. Improvements in such devices are described in U.S. Pat. No. 5,562,819, owned by the assignee of the present application, which provides an underground, in-line apparatus for trapping and collecting debris in a sewer or storm flow conduit, a secondary trap which provides continued protection when primary collection traps are full, a system which signals when primary bags or nets are full and servicing is required, and a trapping facility in which bags or nets may be replaced without loss of trapping protection during servicing.

More specifically, the device in the patent referred to above includes an enclosure or chamber with an inlet and an outlet each adapted to be connected to a sewer, storm drain conduit or outflow. A debris removing system is disposed within the chamber between the inlet and the outlet for trapping and collecting water borne debris entering at the inlet and thereby providing for an outflow of substantially debris-free water. The enclosure includes an access opening comprising upper doors or hatches or access hatches in the enclosure sized to allow the debris removing system to be removed and replaced. The debris removing system specifically includes a perforated container having an open end facing the inlet of the chamber. The perforated container includes a netting assembly that traps and collects the trash or floating debris. The container is in the form of a netting assembly having a flexible bag-shaped mesh net attached to a frame. The netting assembly is attached to lifting structure having supports or handles for allowing the frame and net to be lifted out when the net is full of captured debris. In some applications, a bypass weir or screen is provided to normally direct flow from the chamber inlet through the open end of the net while allowing flow to bypass the net and flow to the chamber outlet when the net is full of debris.

Sensing and signaling elements are typically provided for sensing and signaling the passage of solid debris around the net when the net is full of debris and is in need of servicing. The sensing and signaling elements may include mechanical structure which permits passage of water, but is displaced by impingement of solid debris flowing around the nets. Displacement of such mechanical structure signals when the net is full of debris, for example, by actuating a visible flag above ground or by actuating an electrical switch which activates an aboveground indicator or remote indicator. The sensing and signaling may include an optical sensor for detecting the passage of debris around the netting assembly. Upon detection of debris, the optical sensor emits a signal indicating that the trap is full of debris. The signal may also activate an aboveground indicator or a remote indicator.

Multiple trap systems are employed in which the enclosure includes side-by-side trap assemblies. Such systems maybe configured such that, upon filling of the first trap, the flow and debris can be diverted over a bypass weir disposed between the inlet ends of the first and second traps so that flow is thereby directed through the second trap and overflow debris is trapped and collected. Closure panels may be provided in a stationary frame structure disposed adjacent the inlet ends of the traps in either the single-trap systems or the multitrap systems to restrain debris from flowing through the chamber during servicing.

The reliability of debris removing systems depends on the strength of the mesh nets and on the manner in which the net material is fabricated into the disposable net assemblies. The resultant hydraulic forces are a function of the velocity of the flow of water through the mesh of the nets as well as on the pressure exerted on the debris trapped by the nets. There are many outfalls where extreme forces exist that are too high for standard and commonly available materials or for materials made by normal fabrication practices to last.

Furthermore, the operation of such debris removal systems results in the nets filling with floatable materials over time as one or more overflows occur. In the process, large objects such as plastic bottles and sheets of plastic wrapping materials tend to cover and blind openings of the mesh, which reduces the overall effective area of the filter and results in higher hydraulic loading on the mesh, contributing to a higher pressure drop through the system and increased loads, and excessive forces on the nets.

Accordingly, a need exists for stronger and more reliable mesh nets in the traps of floatable debris collecting systems, and particularly for net assemblies that can be easily constructed and easily replaced.

SUMMARY OF THE INVENTION

A primary objective of the present invention is to provide a stronger and more reliable mesh net for the traps of systems for collecting floatable debris than have been provided by the prior art. A further objective of the invention is to provide a reliable net assembly for such systems that can be easily constructed and easily replaced.

According to principles of the present invention, disposable mesh nets are provided for debris traps that can withstand higher level of forces than can nets of the prior art. Such nets are, according to a preferred embodiment, made with a high strength and high stretch yarn and may be provided with reinforcing tape on seams and high stress areas of the net material. The flexible, stretchable mesh material allows for an increase in the free area of the mesh as the nets expand under hydraulic loads as the nets fill. High elasticity materials are those that are elastic enough, either due to their composition or the ways in which they are knitted, to allow the nets to deform when clogged with debris and thereby expand to allow flow paths around the trapped debris to minimize pressure. Nylon that has these properties would, for example, be suitable. The knit of the mesh material yarn is selected to produce the desired aperture size and maximize the breaking strength of the finished material and ability to maintain constant aperture. The material used in the manufacturing process enables the flexible mesh to maintain a consistent percentage of free area as the nets fill and expand. The material is fabricated into the form of a bag-shaped mesh net from flat material with seams that are rolled and stitched to give a strength greater than the knitted material itself.

Further according to principles of the invention, a netting assembly is provided with structure for holding the mouth of the bag-shaped net in an open position and which can be easily and securely attached to the netting material. In the preferred embodiment, the structure includes a one-piece frame that is provided with a strap configured to hold the netting material in place on the frame. The strap fits in a recessed groove molded into the outer perimeter of a generally rectangular molded plastic frame. Rows of raised buttons integrally molded into the frame extend from the bottom of the groove such that the mesh net will be sandwiched between the strap and the buttons. The frame is sized to provide sufficient strength to counter the hydraulic forces on the net. This particular embodiment of the invention is particularly suited to resist hydraulic forces in the dirty environment wherein the netting assemblies trap floating debris from waterways, sewers or storm drain conduits, as the frame assembly requires no removable locks, pins, clamps, brackets or other devices to hold down the netting material to the frame. The structure has a minimum of parts to collect debris while permitting the netting assembly to be loosened from the system with a pair of gloved hands.

In other embodiments, the netting assemblies are provided with a two part molded plastic rectangular frame, the parts of which clamp together with the knitted mesh material around the mouth of the net clamped therebetween, thereby evenly distributing the forces around the mouth of the net and holding the mouth in an open condition. The two part frame uses hole and post members on the respective parts that snap together for easy assembly. In another alternative embodiment, a one part rectangular frame is provided to which four plates having post members clamp into hole members on the frame. These embodiments have limited projections, thereby avoiding the collection thereon of debris with structure that can easily be loosened by gloved hands.

In accordance with certain principles of the invention, the traps are provided with net assemblies having a two-stage filter mesh. The nets for such traps are constructed of an inner net and an outer net. The inner net provides a first layer of mesh having larger aperture mesh openings so that the inner net captures only the larger items of debris, allowing the smaller items to pass through to the outer net or second layer of mesh. The outer net has smaller openings that trap smaller items of debris that pass through the openings of the inner net. The openings in the inner net may, for example, be at least two or three times the dimension of the openings in the outer net, or have an area from about four to ten times the area of the openings in the outer net. The outer net may also have a greater volume than the inner net, for example, at least about one fourth larger than that of the inner net. The two stage filter produces a larger effective filtering capacity, in that the trap does not blind as quickly, holds more material and distributes the hydraulic loads between the two layers resulting in greater overall strength. Further, were the first or inner net to fail, the second or outer net retains the ability to trap additional debris.

These and other objectives and advantages of the present invention will be more readily apparent from the following detailed description of the preferred embodiments of the invention, in which:

DETAILED DESCRIPTION OF THE PREFERRED EMBODIMENT

Figure 1:
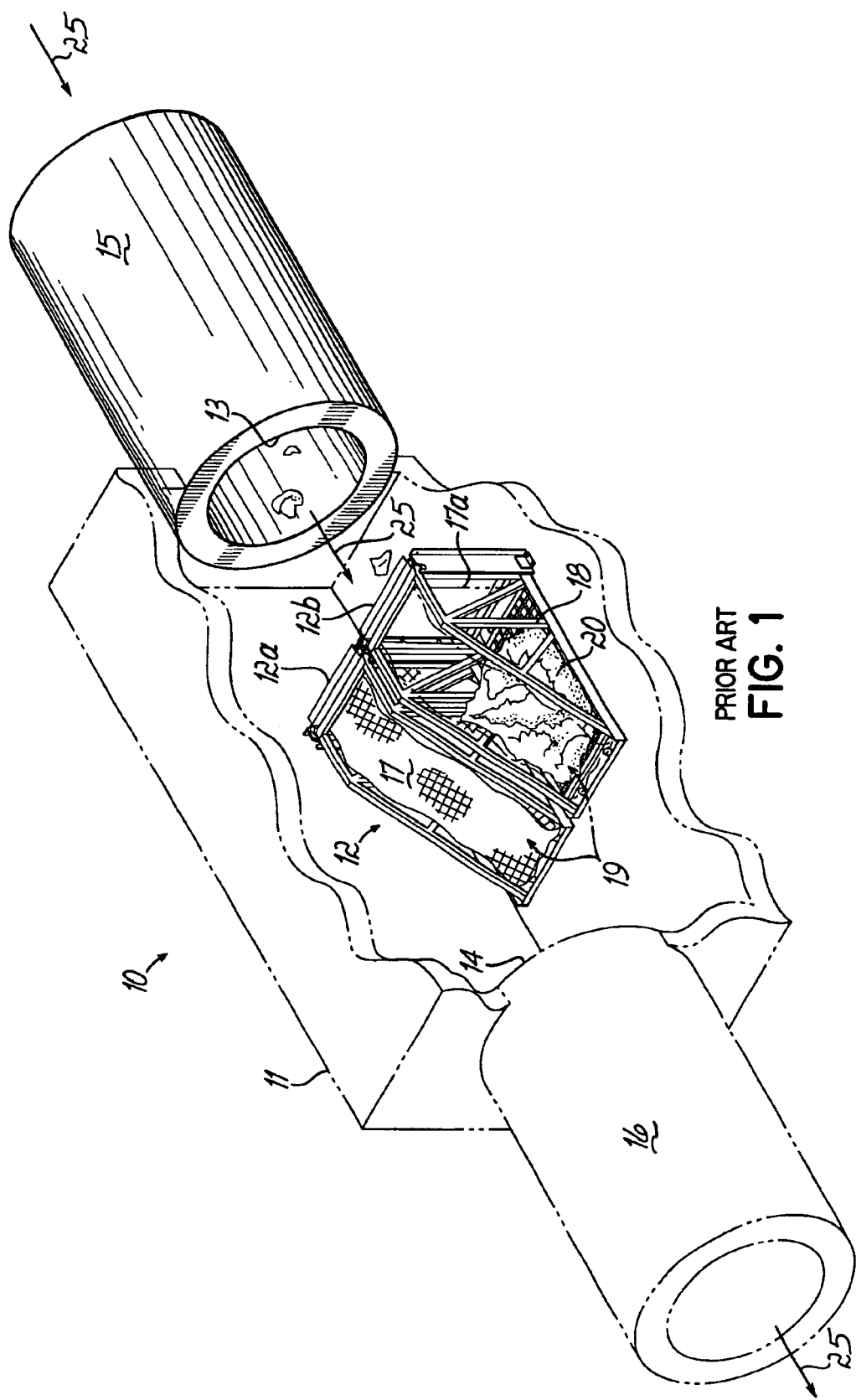
FIG. 1 is a perspective view showing the common features of a debris trapping system of the prior art for the removal of trash or floatables from flowing water.

FIG. 1 illustrates the basic components of one system 10 of the prior art described in the background of the invention above. The system 10 includes one or more traps 12, illustrated as two in number, separately designated as traps 12a and 12b. The traps 12a,12b are located within a flow constraining housing or enclosure 11 between inlet 13 and outlet 14 thereof. The inlet 13 and the outlet 14 are each respectively connected in a known manner to conduits 15 and 16, which may be storm drain or combined sewer conduits or other structures or the terrain of the site. The traps 12a,12b each include a netting assembly 19 formed of a bag-shaped mesh net 17 that is attached to a lifting basket 18. Each of the netting assemblies 19 captures and holds floatable velocity borne debris 20 entering enclosure 11 through inlet 13. The arrows 25 indicate the direction of water flow.

Perforations or openings in nets 17 may vary in size depending on the intended use, with sizes generally in the range of from about 0.1" to about 2". Nets 17 are open on the upstream facing end 17a thereof, toward inlet 13 of enclosure 11. Upper support members (not shown in FIG. 1) are attached to lifting baskets 18 for allowing the netting assemblies 19 of traps 12a,12b to be lifted out of enclosure 11 for periodic removal of captured debris. The netting assemblies 19 are configured such that the nets 17 provide a large filter area for the size of the mouth, thereby minimizing head loss. For example, 80 square feet of net 17 may be provided for a netting assembly mouth area of 6½ square feet, resulting in a pressure drop across a net 17 of three or four pounds.

A bypass weir (not shown in FIG. 1) or screen is typically located upstream of traps 12 and on one side of inlet 13 to permit continued flow in the event that the nets 17 of traps 12a, 12b are filled to capacity with debris. To signal that nets 17 of the netting assemblies 19 of traps 12a, 12b are in need of replacement or emptying, sensing and signaling mechanisms may be provided. The multiple trap system 10 can be configured to provide continuous and uninterrupted capture of debris through second trap 12b after the netting assembly of first trap 12a has been filled and during the process of removing and replacing it. While servicing is being performed, movable panels can be positioned in front of each respective trap 12a or 12b being serviced, as necessary, prior to its removal from enclosure 11. In this way, the system 10 is protected against passage of floatable debris during net removal and replacement.

Figure 1A:
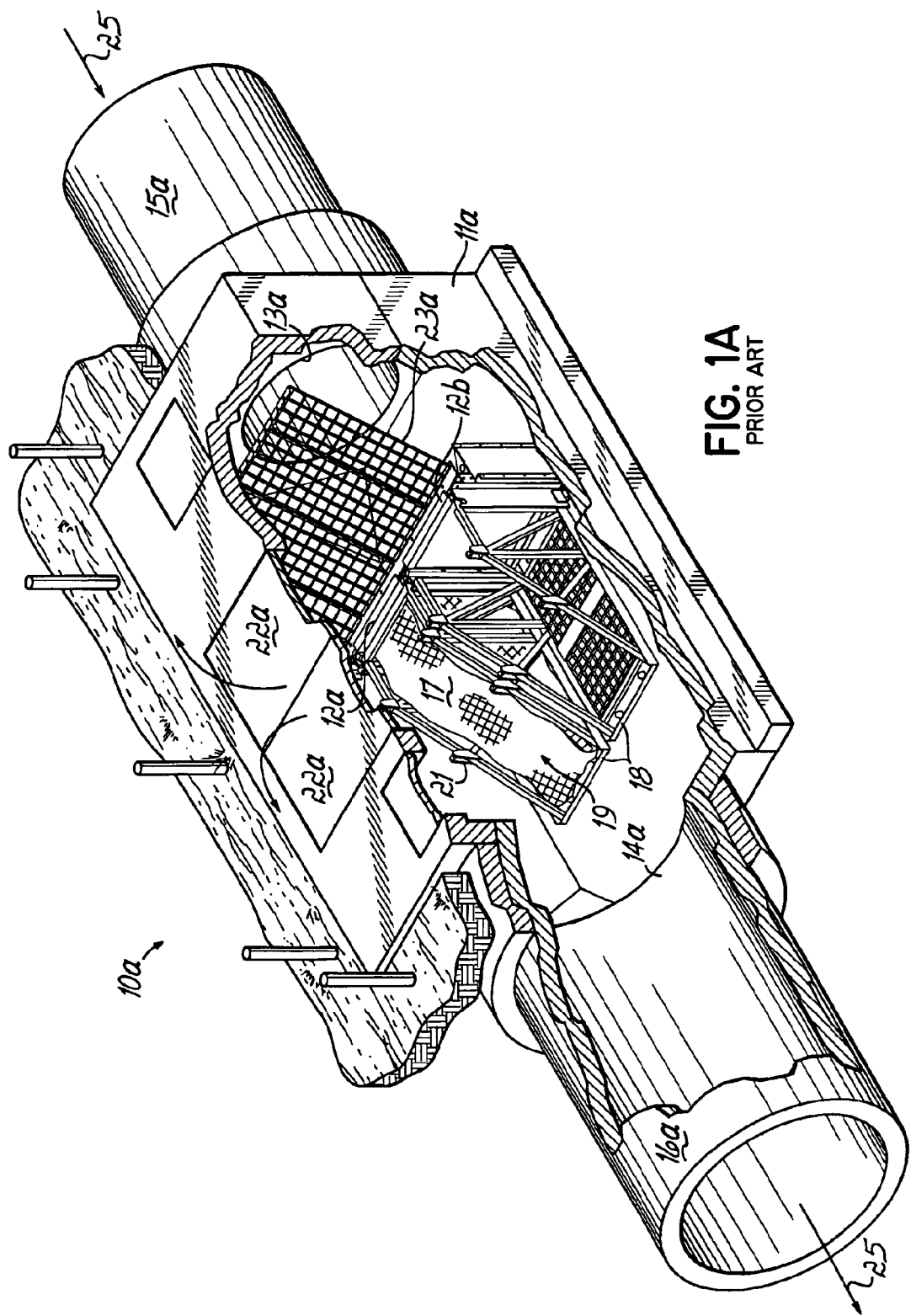
FIG. 1A is an underground in-line version of the prior art system of FIG. 1.
Figure 1B:
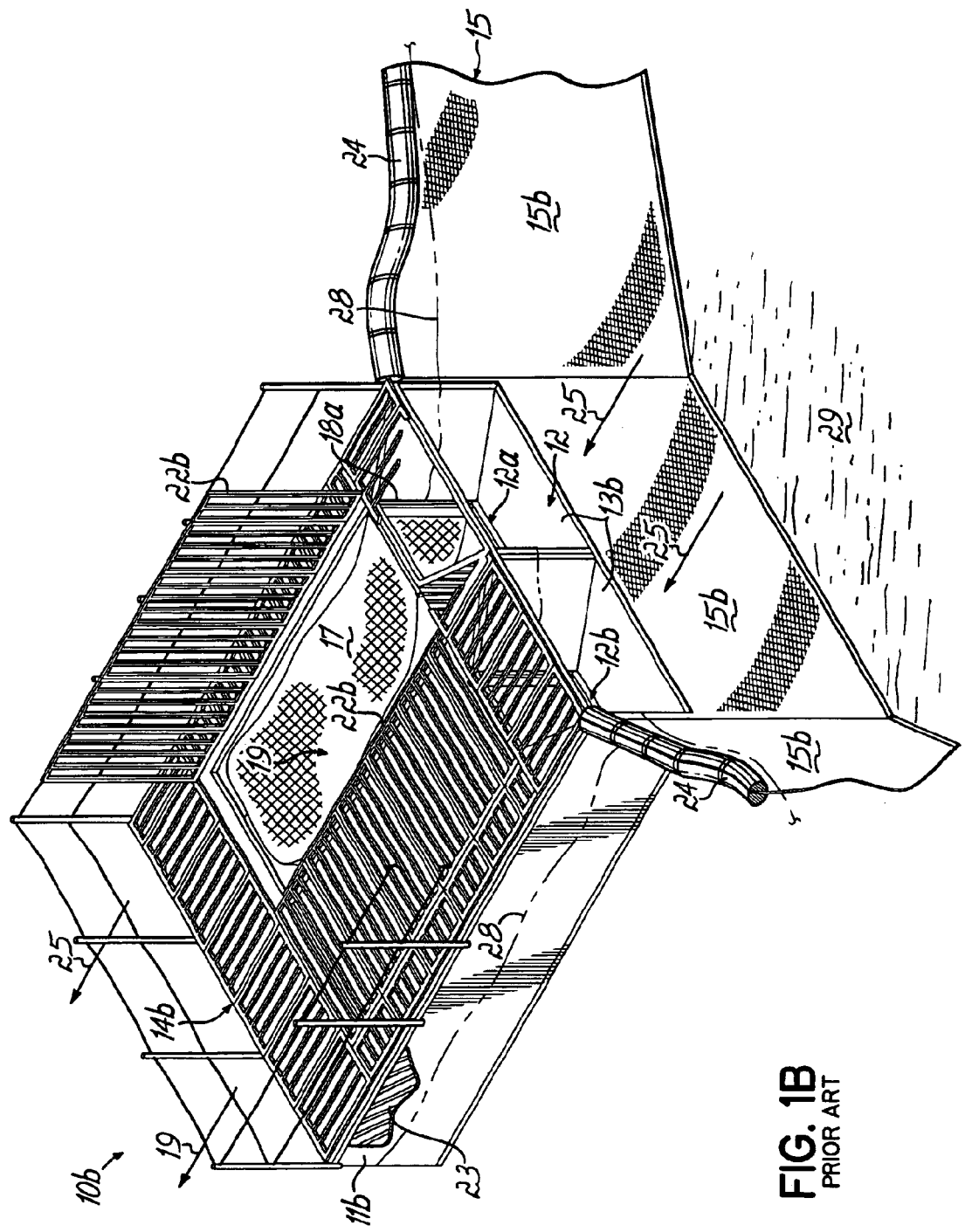
FIG. 1B is a floating version of the prior art system of FIG. 1.
Figure 1C:
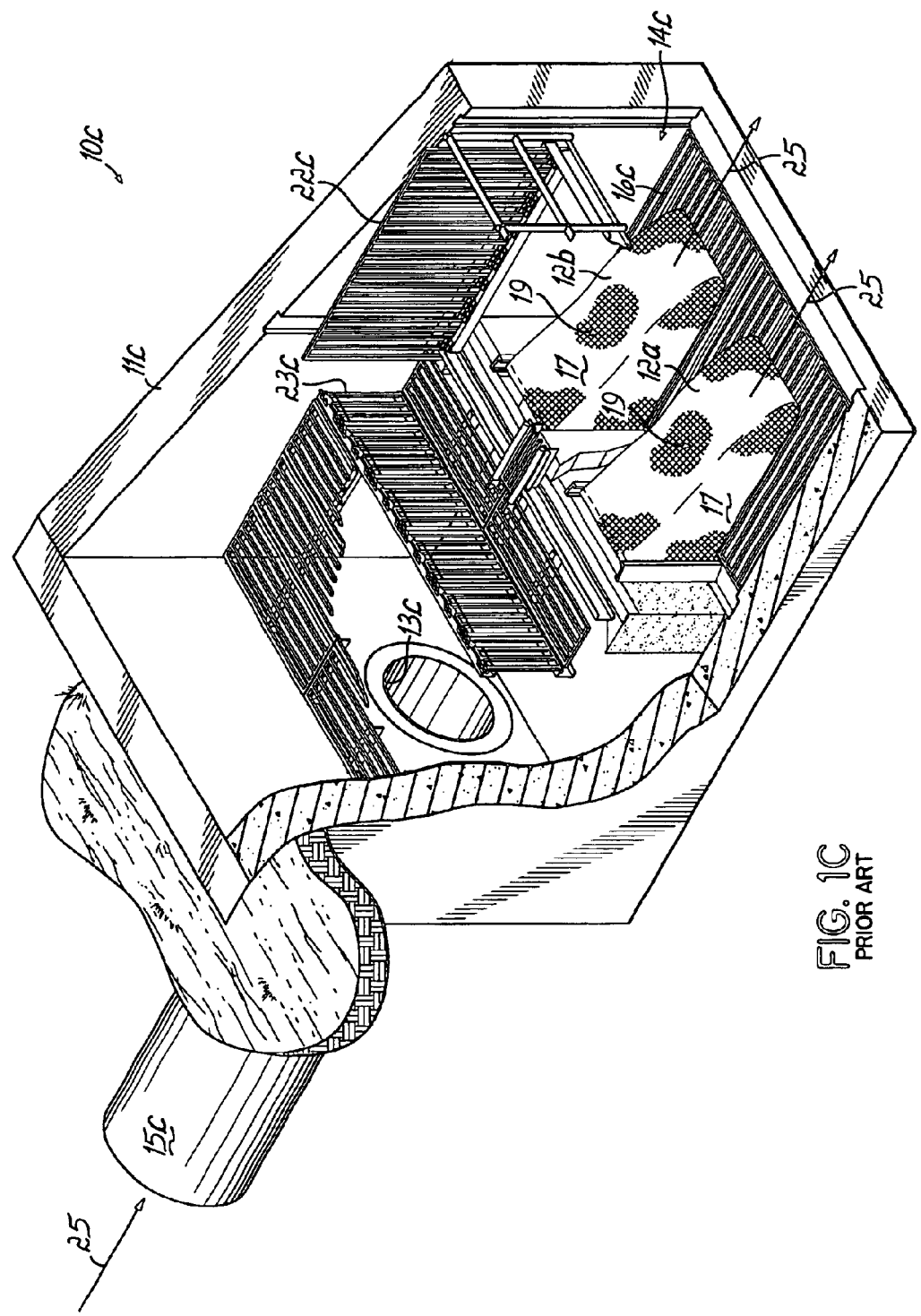
FIG. 1C is an end-of-pipe version of the prior art system of FIG. 1.

FIGS. 1A–1C illustrate the basic system 10 of the prior art in three environments. These arrangements are generally described in a publication of the United States Environmental Protection Agency, Office of Water, No. EPA 832-F-99-037, September, 1999, hereby expressly incorporated by reference herein.

In particular, in FIG. 1A, an in-line system 10a is illustrated in which the two traps 12a,12b are contained in an enclosure in the form of an underground or subterranean vault 11a. The vault 11a includes its inlet 13a and its outlet 14a respectively connected to conduits in the form of buried pipes 15a, 16a, for example, of a storm drain. The in-line traps 12a, 12b each include a netting assembly 19 with a mesh net 17 installed in and held in place by a respective lifting basket 18. A lifting bridle (not shown) is attached to upper support members 21 of the lifting basket 18 for allowing the netting assemblies 19 of traps 12a and 12b to be lifted out of vault 11a through doors 22a for periodic removal of captured debris. A bypass screen 23a is located above the traps 12a,12b to allow flow to divert from the inlet 13a to permit continued flow in the event that nets 17 of the traps 12a, 12b are both filled to capacity with debris.

In FIG. 1B, a floating system 10b is illustrated that is configured to float in a body of water in front of a stream, pipe or other water source from which enters into the body of water a flow of water containing trash or floatables to be removed by the system. The direction of water flow into and through the system 10b is also indicated by arrows 19. The floating system 10b also includes two traps 12a,12b, shown in a floating hull 11b that is provided with closed cell foam panels 23 and pontoons to float the hull at the surface 28 of the body of water. The traps 12a, 12b also each include a mesh net 17 held in place within a lifting support 18a. Because the system 10b is floating and the traps 12a, 12b are immersed in water, a less extensive support frame 18a is substituted for the lifting basket 18 of system 10a, described above.

In the system 10b, the hull 11b has its inlet 13b extending above and below the surface 28 of the water so that trash or floatables at and immediately below the surface enter through it into the interior of the hull 11b. The hull 11b has its outlet 14b below the water surface 28 on the back of the hull 11b. The inlet conduit 15 is formed of a set of curtains 15b which hang from below the inlet 13b and from floats 24 extending respectively between the hull 11b on both sides of the inlet 13b to the shore on the opposite sides of the flowing source, connected to buried concrete conduits (not shown) of a storm drain, for example. The curtains 15b may extend from the water surface 28 to the bottom 29 of the water body and channel water from the source into the inlet 13b. The traps 12a, 12b are supported in the hull 11b in a manner similar to the way they are supported in the vault 11a described above. They can be lifted out of hull 11b through grate doors 22b for periodic removal of captured debris from the nets 17 thereof.

In FIG. 1C, an end-of-pipe system 10c is illustrated in which the two traps 12a,12b are shown in an enclosure in the form of a surface mounted three-sided concrete headwall and knee wall enclosed cavity 11c having an open end that defines its outlet 14c. The cavity 11c has its inlet 13c connected to a pipe 15c draining into the cavity 11c. The traps 12a, 12b each include a net assembly 19 having a mesh net 17. A fiberglass drain grating 16c is provided beneath the netting assemblies 19 to allow flow to exit each net 17 through its bottom to the outlet 14c of the enclosure 11c. The net 17 of each netting assembly is attached to a lifting structure (not shown), which may be similar to the lifting basket 18 described in FIG. 1A above, or in the form of lifting frame 18a described in FIG. 1B above where the traps 12a,12b are submerged. Door grates 22c are provided above the traps 12a, 12b to permit them to be raised for periodic removal of captured debris. A bypass weir 23c may be located above the traps 12a, 12b to allow flow to divert from the inlet 13 to permit continued flow in the event that traps 12a, 12b are both filled to capacity with debris.

Figure 2:
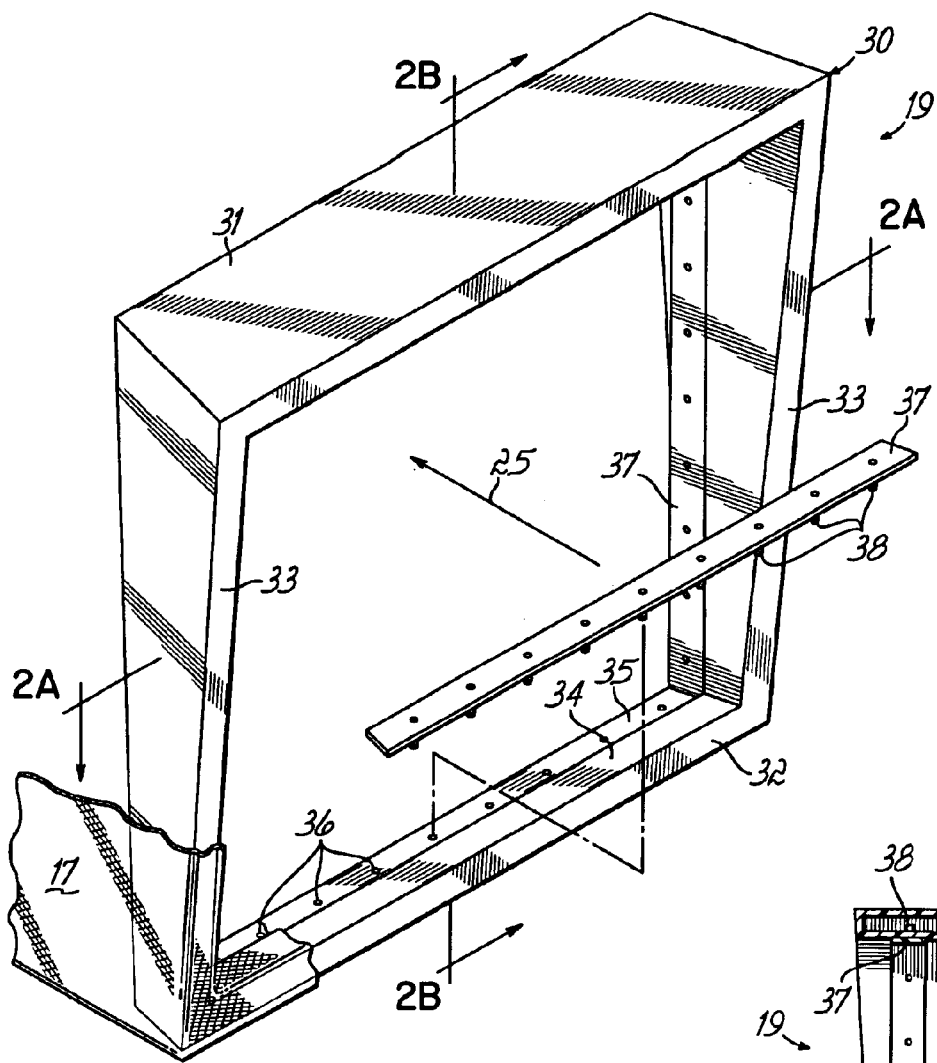
FIG. 2 is a perspective view of the net assembly of a trap according to certain principles of the invention.
Figure 2A:
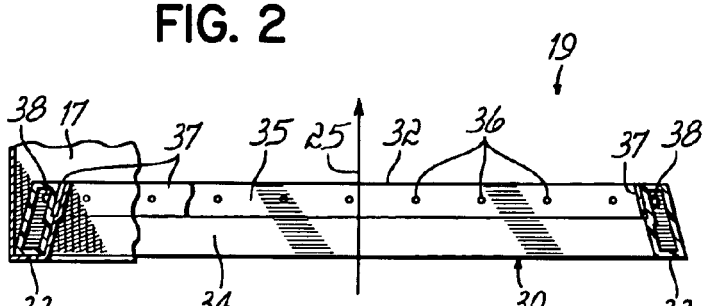
FIG. 2A is a cross-sectional view along line 2A—2A of FIG. 2.
Figure 2B:
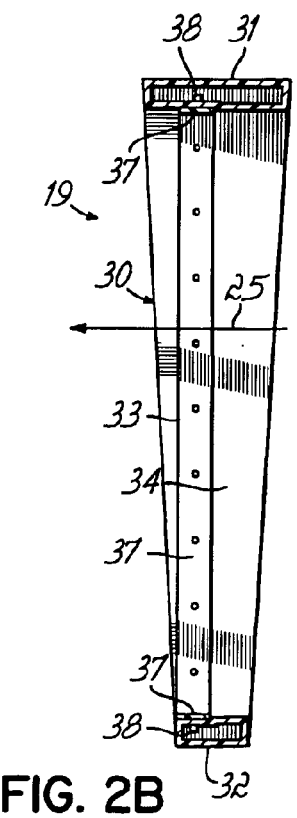
FIG. 2B is a cross-sectional view along line 2B—2B of FIG. 2.

In FIGS. 2, 2A and 2B are illustrated netting assemblies for the traps 12 for use in systems 10 of the various types illustrated in FIGS. 1A–1C described above. According to certain aspects of the invention, the netting assemblies 19 are constructed with a mesh net 17 connected to a frame assembly 30. The frame assembly 30 includes a rectangular frame body having a pair of horizontal top and bottom members 31 and 32, respectively, and a pair of side members 33. The top member 31 is wider than the bottom member 32, and the side members 33 are tapered from the wider top member toward the narrower bottom member 32, as illustrated in FIG. 2B, for easy installation and removal from the lifting basket 18 or support frame 18a. The side members 33 are also inwardly tapered in the downstream direction, as illustrated in FIG. 2A, to lock into the supporting rails as the flow goes through the nets 17. Flow direction is indicated by the arrows 25.

Each of the members 31–33 has a rim 34 on the upstream side thereof and a recessed step 35 on the downstream side thereof. A pattern of holes 36 is formed in the steps 35 of each of the members 31–33. Each of the members 31–33 has associated therewith a plate 37 having a plurality of projections in the form of posts 38 arranged in a pattern that corresponds to the pattern of the holes 36 in the respectively associated member 31–33 of the frame 30 so that the plates 37 can be connected to the members 31–33 by snap fitting the posts 38 into the holes 36. The plates 37 are so connected with the edge of the mouth of the net 17 between the plate 37 and the respective member 31–33 and the posts 38 extending through holes in the mesh of the net 17, thereby locking the mouth of the net 17 to the frame 30. When so connected, the plates 37 set into the steps 35 so that the tops thereof are flush with the lip 34 of the members 31–33. When the net 17 is attached to the frame 30, the net extends around the outside of the members 31–33 with the mouth of the net wrapping around the upstream side of the frame 30 to the inside of the frame 30 and between the plates 37 and the members 31–33.

The frame 30 may be made of wood and the plates 37 made of metal, but other materials may be used. In one preferred embodiment, the frame 30 is formed of an integral piece of molded plastic material. The plates 37 may also be formed of molded plastic. The frame 30 securely attaches to the nets 17 by being formed of elements that clamp together with the mesh material of the nets 17 between them, with one of the elements having posts or projections thereon against which the other member bears so that the projections serve as hooks that trap the net between the elements while the other element prevents the net from slipping off the projections.

An alternative frame structure 18 is illustrated in FIGS. 3, 3A, 3B and 3C, in which mesh net 17 is shown connected to a frame assembly 40. The frame assembly 40 is a two part rectangular frame that includes an inner frame portion 40a having an array of holes 46 on the upstream facing side thereof and an outer frame portion 40b having a matching array of posts on the downstream facing side thereof. The two portions 40a,40b of the frame snap together and clamp the mouth of the net 17 therebetween. The two parts of the frame 40 are preferably formed of an integral piece of molded plastic, but other materials may be used.

Figure 3:
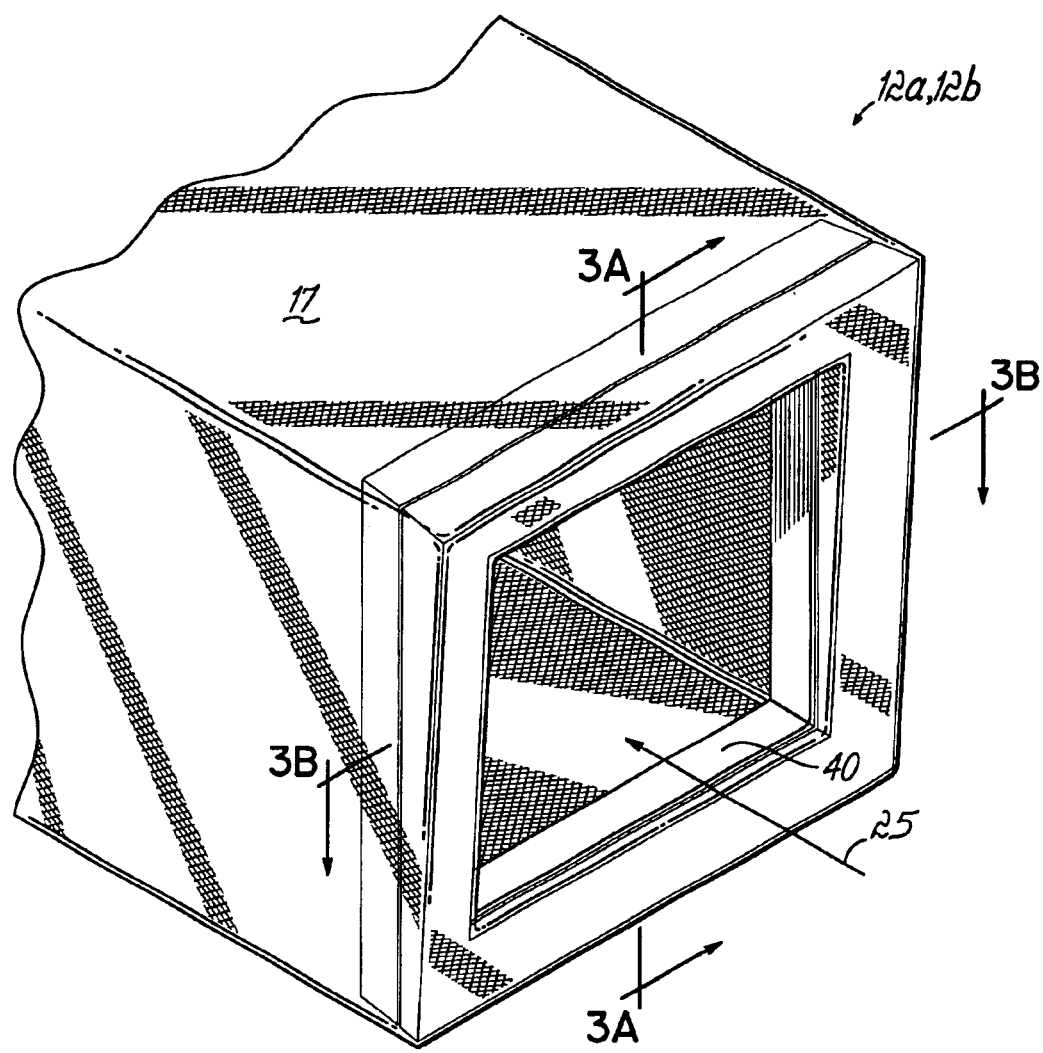
FIG. 3 is a perspective view of the net of a trap utilizing a net frame construction alternative to that of FIG. 2.
Figure 3B:
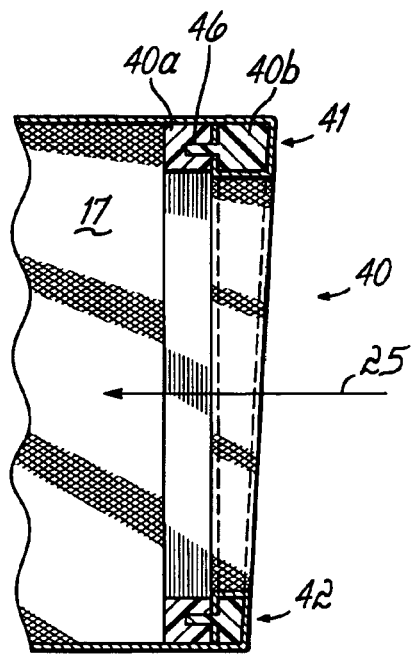
FIG. 3B is a cross-sectional view along line 3B—3B of FIG. 3.
Figure 3B:
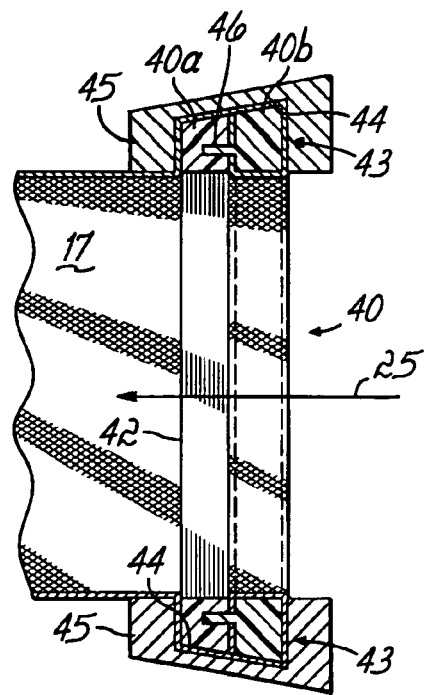
Figure 3A:
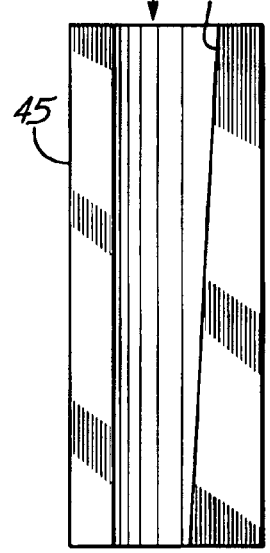
FIG. 3A is a cross-sectional view along line 3A—3A of FIG. 3.
Figure 3C:
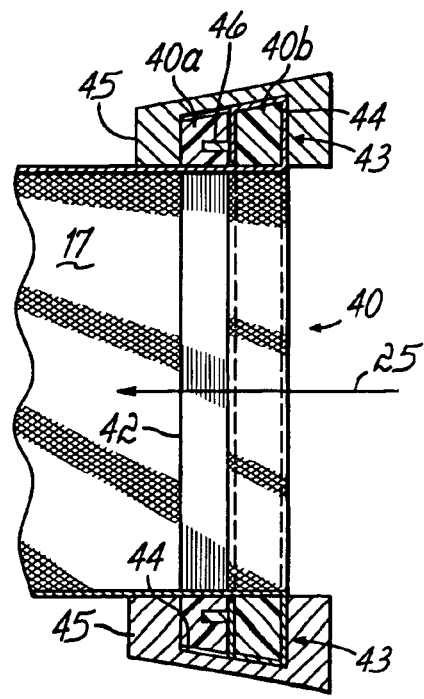
FIG. 3C is a cross-sectional of an alternative to FIG. 3B.

The frame 40 has a pair of horizontal top and bottom members 41 and 42 and a pair of side members 43. The side members are tapered inwardly in the downstream direction and fit in correspondingly tapered vertical channels 44 in vertical rails 45 that are part of the lifting basket 18 or support frame 18a. Further, the top member 41 is thicker in the flow direction (that is, upstream to downstream) than is the bottom member 42; and the side members 43 are correspondingly tapered in the downward direction to fit into the channels 44, which are similarly tapered, as illustrated in FIG. 3A. As a result of the tapers, the frame 40 of the netting assemblies 19 fit firmly in the channels 44 of the rails 45 when in position, but can be loosened by impact and removed with a minimum of sliding friction. FIG. 3B shows the net 17 wrapped around the outside of the frame 40 with the mouth of the net 17 wrapping around the front of the frame 40 and extending between the portions 40a,40b thereof from the inside. Alternatively, FIG. 3C shows the net 17 wrapped around the inside of the frame 40 with the mouth of the net 17 wrapping around the front of the frame 40 and extending between the portions 40a,40b thereof from the outside.

As a result of the tapers described above, the greater the forces on the traps, the more tightly the mesh nets 17 are gripped and the less likely are the nets to pull out or tear around the posts.

Figure 4A:
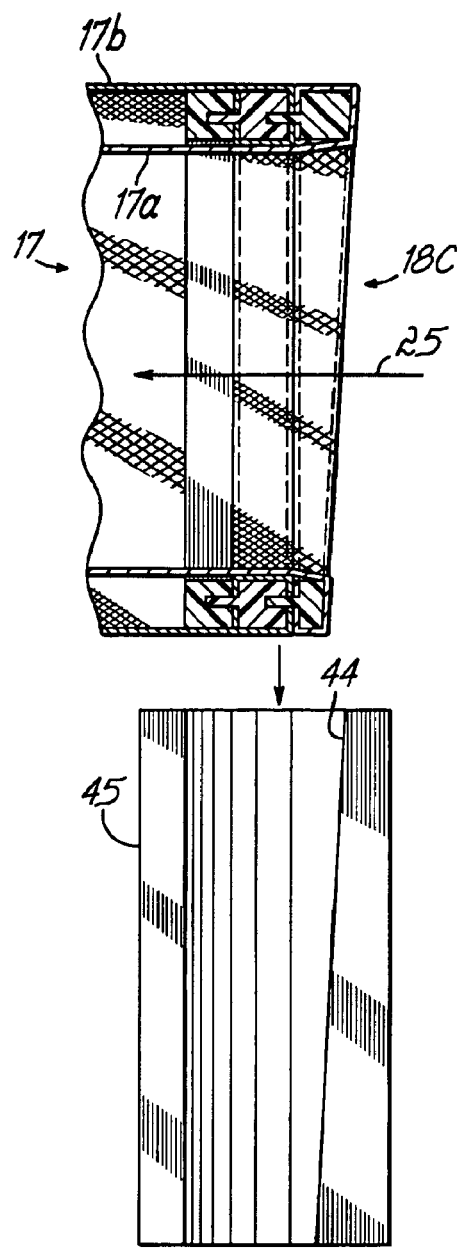
FIGS. 4A–4B are cross-sectional views illustrating double net construction according to certain embodiments of the present invention.
Figure 4B:
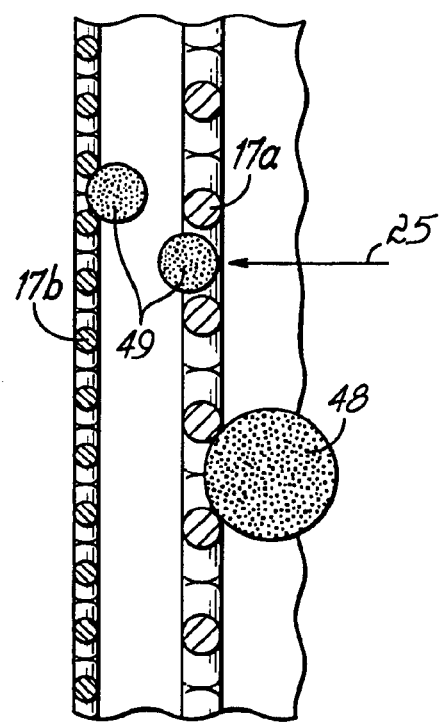

FIG. 4A illustrates a two layered net 17 that includes an inner net 17a of a course mesh having holes mounted to frame structure 18c so as to extend through the inside of the frame and with an outer net 17b of a fine mesh mounted to frame structure 18c so as to extend around the outside of the frame and thereby enclosing the inner net. The holes in the inner net 17a may, for example, be about 1–2 inches in size with the holes in the outer net 17b being of about ½ inches in size. The holes of the inner net 17a should be at least two to three times larger on a side than those of the outer net, with a cross sectional area of at least about four times the area of the holes of the outer net. As a result, large pieces of debris 48 such as plastic bottles, cans, plastic bags, styrofoam cups, etc. only are trapped by the inner net 17a while smaller pieces of debris 49 pass through the larger holes of the inner net 17a and are trapped by the outer net 17b.

Figure 5:
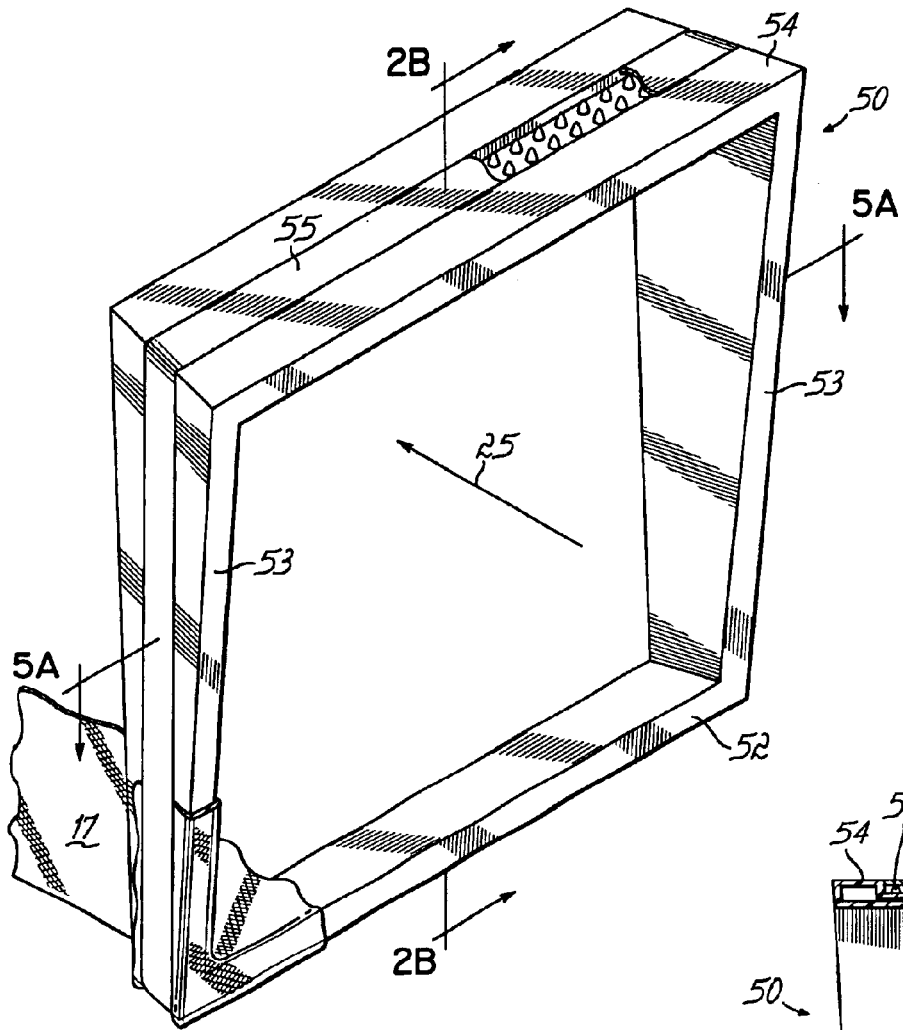
FIG. 5 is a perspective view of the net assembly of a trap according to an alternative embodiment of the invention.
Figure 5A:
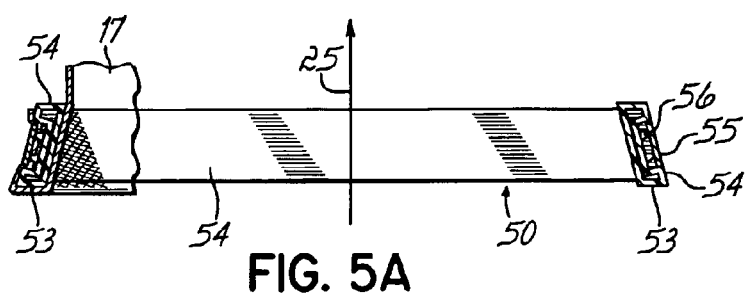
FIG. 5A is a cross-sectional view along line 5A—5A of FIG. 5.
Figure 5B:
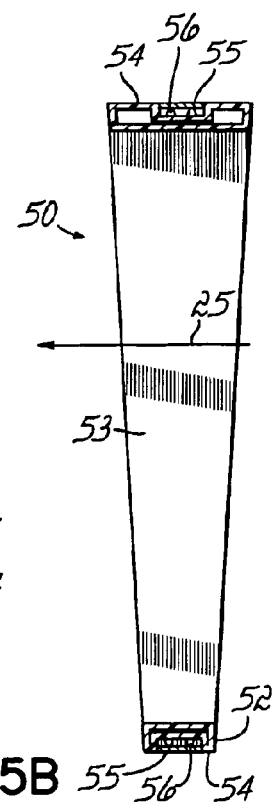
FIG. 5B is a cross-sectional view along line 5B—5B of FIG. 5.

FIGS. 5, 5A and 5B illustrate netting assemblies for the traps 12 that are alternative embodiments of the assemblies of FIGS. 2–2B and FIGS. 3–3C described above. In FIGS. 5–5B, the traps 12 are each constructed with mesh net 17 connected to a frame assembly 50. The frame assembly 50 includes a rectangular frame body. As with the embodiments above, the frame 50 is preferably formed of an integral piece of molded plastic, but other materials are suitable. The body of frame 50 has a pair of horizontal top and bottom members 51 and 52, respectively, and a pair of side members 53, with the top member 51 wider than the bottom member 52 and the side members 53 tapered from top to bottom as was illustrated in the embodiment of FIG. 2B. The side members 53 are also inwardly tapered in the downstream direction, as illustrated in FIG. 5A. Each of the members 51–53 has an outside surface 54 having a groove 55 extending around the frame 50. On the bottom surface of the groove 55 is preferably a plurality of projections or posts 56 to help grasp the netting material, particularly where the frame is formed of plastic or other low friction material. A clamping element in the form of a tension band 57 lies in the groove 55 in contact with the tips of the projections 56. The tension band may be of a natural fiber, metal or plastic. Plastic is particularly suitable for the band 57. The net 17 extends between the band 57 and the frame members 51–53, so that the mouth of the net 17 is locked to the frame 50. When the frame 50 is inserted into the rails of the system, the tapered frame is forced against the frame by the forces produced by the flowing water on the net 17 to further clamp the net 17 between the frame 50 and the rail.

Other applications of the invention can be made. Those skilled in the art will appreciate that the applications of the present invention herein are varied, and that the invention is described in preferred embodiments. Accordingly, additions and modifications can be made without departing from the principles of the invention. Accordingly, the following is claimed;

What is claimed is:

1. A disposable net assembly for a removal system for floating debris comprising:

a knitted, flexible mesh net having a mouth at one end, a closed end, and a rim surrounding the mouth;

a frame surrounding the mouth of the net, the frame having an upstream side and a downstream side, an inside and an outside;

the frame being formed of four members including a top member, a bottom member and two side members;

the frame having at least one clamping element and a plurality of projections extending integrally either from the frame or the clamping element;

the net being secured to the frame with the rim thereof extending over the projections between the clamping element and the frame on one side of the frame, with the net wrapping from the projections around the upstream side of the frame, and with the closed end extending to the downstream side of the frame.

2. The assembly of claim 1 wherein:

the frame is formed of a plastic material of four straight members including a top member, a bottom member and two side members, each member having a plurality of holes therein;

the net has the mouth thereof extending from the downstream side of the frame, around the outside of the frame, around the upstream side of the frame and over the plurality of holes; and the frame has at least one clamping element thereof having a plurality of posts projecting therefrom, said clamping element being secured to the members with the posts snapped into the holes and clamping the mouth of the net to the frame.

3. The assembly of claim 1 wherein:

the side members of the frame are inwardly tapered in the downstream direction and wider, in the upstream-to-downstream direction, at the top than at the bottom.

4. The assembly of claim 1 wherein:

the at least one clamping element includes a set of four straight plates, each having posts projecting integrally therefrom;

the holes are on the inside of the members; and the plates clamp the mouth of the net to the frame along the inside of the members.

5. The assembly of claim 1 wherein:

the at least one clamping element includes a rectangular frame clamping portion having the projections thereon; the holes in the frame and the posts in the frame clamping portion facing in one of the upstream or downstream directions and clamps the mouth of the net therebetween.

6. The assembly of claim 1 wherein:

the projections extend outwardly from the outside of the frame and the clamping element is a tension band extending around the frame with the mouth of the net and the projections between the band and the frame.

7. The assembly of claim 1 wherein:

the projections extend outwardly from a groove around the outside of the frame and the clamping element is a tension band extending around the groove with the mouth of the net and the projections between the band and the frame.

8. The assembly of claim 1 wherein:

the net is formed of a high strength and high stretch yarn, with rolled sewn seams and having reinforcing on the seams and on high stress areas of the net.

9. The assembly of claim 1 wherein:

the outside of the side members are tapered inwardly front-to-back and the upstream-downstream sides converge from top to bottom.

10. A disposable net assembly for a removal system for floating debris comprising:

a rectangular frame formed of four members including a top member, a bottom member and two side members, each member having two opposite ends and at least four sides, the sides including an upstream side and a downstream side opposite the upstream side, and an inside and an outside opposite the inside, each member being joined at each end to an end of an adjacent member to form the rectangular frame;

a knitted mesh bag-shaped net having a mouth attached around the perimeter thereof to the four members of the frame; and at least two of the members each having at least one side thereof that is tapered relative to the side that is opposite thereof.

11. The assembly of claim 10 wherein the at least two members having the at least one side that is tapered comprises the two side members each having an upstream and downstream sides thereof that converge from top to bottom.

12. The assembly of claim 11 wherein the at least two members having the two side members each has an upstream side thereof inclined downstream from top toward the bottom thereof.

13. The assembly of claim 12 wherein the at least two members having the two side members each has an outside thereof inclined inwardly from upstream to downstream sides thereof.

14. The assembly of claim 13 wherein the at least two members having the two side members each has an inside and an outside thereof that converge from upstream to downstream.

15. The assembly of claim 12 wherein the at least two members having the two side members each has an inside and an outside thereof that converge from upstream to downstream.

16. The assembly of claim 11 wherein the at least two members having the two side members each has an inside and an outside thereof that converge from upstream to downstream.

17. The assembly of claim 10 wherein the at least two members having the at least one side that is tapered comprises the two side members, each having an inside and an outside thereof that converge from upstream to downstream.

18. The assembly of claim 17 wherein the at least two members having the two side members each has an outside thereof inclined inwardly from upstream to downstream sides thereof.

19. The assembly of claim 18 wherein the at least two members having the two side members each has an upstream and downstream sides thereof that converge from top to bottom.

20. The assembly of claim 18 wherein the at least two members having the two side members each has an upstream side thereof inclined downstream from top toward the bottom thereof.

21. The assembly of claim 17 wherein the at least two members having the two side members each has an upstream side thereof inclined downstream from top toward the bottom thereof.

22. The assembly of claim 10 wherein the at least two members having the two side members each has an upstream side thereof inclined downstream from top toward the bottom thereof.

23. The assembly of claim 22 wherein the at least two members having the two side members each has an outside thereof inclined inwardly from upstream to downstream sides thereof.

24. The assembly of claim 10 wherein the at least two members having the at least one side that is tapered comprises the two side members each having an outside thereof inclined inwardly from upstream to downstream sides thereof.

25. The assembly of claim 24 wherein the at least two members having the two side members each has an upstream and downstream sides thereof that converge from top to bottom.

26. The assembly of claim 25 wherein the at least two members having the two side members each has an inside and an outside thereof that converge from upstream to downstream.

* * * * *

UNITED STATES PATENT AND TRADEMARK OFFICE
CERTIFICATE OF CORRECTION

| | |
|---|---|
| PATENT NO. | : 6,866,153 B2 |
| APPLICATION NO. | : 10/705350 |
| DATED | : March 15, 2005 |
| INVENTOR(S) | : Richard R. Turner et al. |

It is certified that error appears in the above-identified patent and that said Letters Patent is hereby corrected as shown below:

Column 10, lines 17-18 read "16. The assembly of claim 11 wherein the at least two members having the two side members each has an inside…" and should read -- 16. The assembly of claim 11 wherein the two side members each has an inside... -- .

Column 10, lines 25-26 read "18. The assembly of claim 17 wherein the at least two members having the two side members each has an outside…" and should read -- 18. The assembly of claim 17 wherein the two side members each has an outside… -- .

Column 10, lines 29-30 read "19. The assembly of claim 18 wherein the at least two members having the two side members each has an upstream..." and should read -- 19. The assembly of claim 18 wherein the two side members each has an upstream... -- .

Column 10, lines 34-35 read "20. The assembly of claim 18 wherein the at least two members having the two side members each has an upstream..." and should read -- 20. The assembly of claim 18 wherein the two side members each has an upstream... -- .

Column 10, lines 36-37 read "21. The assembly of claim 17 wherein the at least two members having the two side members each has an upstream..." and should read -- 21. The assembly of claim 17 wherein the two side members each has an upstream... -- .

Column 10, lines 40-41 read "22. The assembly of claim 10 wherein the at least two members having the two side members each has an upstream..." and should read -- 22. The assembly of claim 10 wherein the two side members each has an upstream... -- .

Column 10, lines 44-45 read "23. The assembly of claim 22 wherein the at least two members having the two side members each has an outside..." and should read -- 23. The assembly of claim 22 wherein the two side members each has an outside... -- .

UNITED STATES PATENT AND TRADEMARK OFFICE
CERTIFICATE OF CORRECTION

PATENT NO. : 6,866,153 B2
APPLICATION NO. : 10/705350
DATED : March 15, 2005
INVENTOR(S) : Richard R. Turner et al.

It is certified that error appears in the above-identified patent and that said Letters Patent is hereby corrected as shown below:

Column 10, line 50 reads "...prises the two side members each having an outside thereof..." and should read -- ... prises the two side members, each having an outside thereof... -- .

Column 10, lines 53-54 read "25. The assembly of claim 24 wherein the at least two members having the two side members each has an upstream..." and should read -- 25. The assembly of claim 24 wherein the two side members each has an upstream... -- .

Column 10, lines 57-58 read "26. The assembly of claim 25 wherein the at least two members having the two side members each has an inside..." and should read -- 26. The assembly of claim 25 wherein the two side members each has an inside... -- .

Signed and Sealed this

First Day of August, 2006

JON W. DUDAS
*Director of the United States Patent and Trademark Office*